US010628233B2

(12) United States Patent
Xu et al.

(10) Patent No.: US 10,628,233 B2
(45) Date of Patent: Apr. 21, 2020

(54) RACK-LEVEL SCHEDULING FOR REDUCING THE LONG TAIL LATENCY USING HIGH PERFORMANCE SSDS (71) Applicant: Samsung Electronics Co., Ltd., Suwon-si, Gyeonggi-do (KR)

(72) Inventors: Qiumin Xu, Los Angeles, CA (US); Krishna Malladi, San Jose, CA (US); Manu Awasthi, Ann Arbor, MI (US)

(73) Assignee: SAMSUNG ELECTRONICS CO., LTD. (KR)

( * ) Notice: Subject to any disclaimer, the term of this patent is extended or adjusted under 35 U.S.C. 154(b) by 136 days.

(21) Appl. No.: 15/467,458

(22) Filed: Mar. 23, 2017

(65) Prior Publication Data

US 2018/0189101 A1 Jul. 5, 2018

Related U.S. Application Data (60) Provisional application No. 62/441,027, filed on Dec. 30, 2016.

(51) Int. Cl.
*G06F 9/46* (2006.01)
*G06F 9/50* (2006.01)

(52) U.S. Cl.
CPC ...... *G06F 9/5088* (2013.01); *G06F 2209/508* (2013.01)

(58) Field of Classification Search
CPC ........................................ G06F 9/52
USPC ........................................ 718/104
See application file for complete search history.

(56) References Cited

U.S. PATENT DOCUMENTS

| 7,646,725 | B1 * | 1/2010 | Soukup | H04L 41/5003 370/252 |
| 8,910,152 | B1 * | 12/2014 | Hyser | G06F 9/45558 718/1 |
| 9,063,769 | B2 * | 6/2015 | Damola | G06F 11/3419 |
| 9,122,503 | B1 * | 9/2015 | Hoff | G06F 21/566 |
| 9,135,063 | B1 | 9/2015 | Ghose | |

(Continued)

FOREIGN PATENT DOCUMENTS

WO 2015130645 A1 9/2015
WO 2016155816 A1 10/2016

OTHER PUBLICATIONS

Delimitrou, et al., "Quasar: resource-efficient and qos-aware cluster management", ASPLOS '14 Proceedings of the 19th International Conference on Architectural support for programming languages and operating systems pp. 127-144, http://www.industry-academia.org/download/2014-asplos-quasar-Stanford-paper.pdf, Mar. 1-5, 2014.

(Continued)

*Primary Examiner* — Mehran Kamran
(74) *Attorney, Agent, or Firm* — Innovation Counsel LLP (57) ABSTRACT A method for migrating a workload includes: receiving workloads generated from a plurality of applications running in a plurality of server nodes of a rack system; monitoring latency requirements for the workloads and detecting a violation of the latency requirement for a workload; collecting system utilization information of the rack system; calculating rewards for migrating the workload to other server nodes in the rack system; determining a target server node among the plurality of server nodes that maximizes the reward; and performing migration of the workload to the target server node.

19 Claims, 7 Drawing Sheets

(56) References Cited

U.S. PATENT DOCUMENTS

| | | | |
|---|---|---|---|
| 9,336,030 B1* | 5/2016 | Marr | G06F 9/45533 |
| 9,378,058 B2 | 6/2016 | Mortazavi | |
| 9,843,470 B1* | 12/2017 | Gartrell | H04L 29/08 |
| 2003/0018781 A1* | 1/2003 | Scheuermann | G06F 15/17381 |
| | | | 709/225 |
| 2009/0150529 A1* | 6/2009 | Tripathi | G06F 9/455 |
| | | | 709/222 |
| 2010/0217454 A1* | 8/2010 | Spiers | G05D 23/1932 |
| | | | 700/300 |
| 2011/0072208 A1* | 3/2011 | Gulati | G06F 3/0613 |
| | | | 711/114 |
| 2011/0093856 A1* | 4/2011 | Campbell | G06F 9/5094 |
| | | | 718/102 |
| 2011/0167421 A1* | 7/2011 | Soundararajan | G06F 9/5077 |
| | | | 718/1 |
| 2012/0054329 A1* | 3/2012 | Gulati | H04L 67/1002 |
| | | | 709/224 |
| 2012/0304175 A1* | 11/2012 | Damola | G06F 11/3419 |
| | | | 718/1 |
| 2013/0055283 A1* | 2/2013 | Mopur | G06F 9/5083 |
| | | | 718/104 |
| 2013/0295795 A1* | 11/2013 | Meng | H01R 24/64 |
| | | | 439/638 |
| 2014/0006578 A1* | 1/2014 | Kohn | H04L 67/1027 |
| | | | 709/223 |
| 2014/0068075 A1* | 3/2014 | Bonilla | H04L 41/0823 |
| | | | 709/226 |
| 2014/0229608 A1 | 8/2014 | Bauer et al. | |
| 2014/0237113 A1* | 8/2014 | Gulati | H04L 47/283 |
| | | | 709/224 |
| 2014/0317261 A1* | 10/2014 | Shatzkamer | G06F 9/455 |
| | | | 709/223 |
| 2014/0380330 A1* | 12/2014 | Xiao | G06F 9/5083 |
| | | | 718/104 |
| 2015/0058844 A1* | 2/2015 | Conklin | G06F 9/45558 |
| | | | 718/1 |
| 2015/0095485 A1* | 4/2015 | Alatorre | H04L 47/125 |
| | | | 709/224 |
| 2015/0106522 A1* | 4/2015 | Ryan | H04L 67/1023 |
| | | | 709/226 |
| 2015/0227537 A1* | 8/2015 | Avati | H04L 67/1097 |
| | | | 707/770 |
| 2015/0235308 A1* | 8/2015 | Mick | H04L 43/0817 |
| | | | 705/26.3 |
| 2015/0263985 A1 | 9/2015 | Schmitter et al. | |
| 2016/0013992 A1* | 1/2016 | Reddy | H04L 67/38 |
| | | | 709/224 |
| 2016/0070593 A1 | 3/2016 | Harris et al. | |
| 2016/0073542 A1* | 3/2016 | Huang | H05K 7/1422 |
| | | | 361/781 |
| 2016/0246746 A1* | 8/2016 | Tan | G06F 9/4411 |
| 2016/0259665 A1* | 9/2016 | Gaurav | G06F 9/4856 |
| 2016/0285732 A1* | 9/2016 | Brech | H04L 43/14 |
| 2016/0285771 A1 | 9/2016 | Kulkarni | |
| 2016/0349992 A1* | 12/2016 | Basak | G06F 3/061 |
| 2017/0006105 A1* | 1/2017 | Shraer | H04L 67/1023 |
| 2017/0024293 A1* | 1/2017 | Bell | G06F 11/1438 |
| 2017/0139742 A1* | 5/2017 | Cropper | G06F 9/4856 |
| 2017/0169529 A1* | 6/2017 | Delaney | G06Q 50/184 |
| 2017/0242729 A1* | 8/2017 | Chen | G06F 9/50 |
| 2017/0331763 A1* | 11/2017 | Li | H04L 47/803 |
| 2017/0346760 A1* | 11/2017 | Kelly | H04L 67/1097 |
| 2018/0004687 A1* | 1/2018 | Guim Bernat | G06F 13/16 |
| 2018/0026851 A1* | 1/2018 | Adiletta | G06F 3/0613 |
| | | | 709/222 |
| 2018/0046581 A1* | 2/2018 | Banerjee | G06F 12/1009 |
| 2018/0060102 A1* | 3/2018 | Zhu | G06F 9/45533 |
| 2018/0060361 A1* | 3/2018 | Beveridge | H04L 47/70 |
| 2018/0062928 A1* | 3/2018 | Beveridge | H04L 41/0886 |
| 2018/0084567 A1* | 3/2018 | Rost | H04L 41/0896 |
| 2018/0088977 A1* | 3/2018 | Gray | G06F 9/45558 |
| 2018/0095776 A1* | 4/2018 | Tsai | G06F 9/5083 |
| 2018/0097912 A1* | 4/2018 | Chumbalkar | H04L 67/34 |
| 2018/0157539 A1* | 6/2018 | Agarwal | G06F 9/5083 |
| 2018/0159775 A1* | 6/2018 | Agarwal | H04L 47/125 |

OTHER PUBLICATIONS

Stanko, et al., "The case for rackout: scalable data serving using rack-scale systems", SoCC'16 Proceedings of the Seventh ACM Symposium on Cloud Computing pp. 182-195, http://homepages.inf.ed.ac.uk/bgrot/pubs/RACKOUT_SOCC16.pdf., Oct. 5-7, 2016.

* cited by examiner

RACK-LEVEL SCHEDULING FOR REDUCING THE LONG TAIL LATENCY USING HIGH PERFORMANCE SSDS

CROSS-REFERENCE TO RELATED APPLICATION(S)

This application claims the benefits of and priority to U.S. Provisional Patent Application Ser. No. 62/441,027 filed Dec. 30, 2016, the disclosure of which is incorporated herein by reference in its entirety.

TECHNICAL FIELD

The present disclosure relates generally to a rack system including solid-state drives (SSDs), more particularly, to a system and method for providing a rack-level scheduler for reducing long tail latencies of high-performance SSDs.

BACKGROUND

Non-volatile memory express (NVMe) defines a register-level interface for host software to communicate with a non-volatile memory subsystem (e.g., an SSD) over a peripheral component interconnect express (PCIe) bus. NVMe over fabrics (NVMeoF) (or NVMf in short) defines a common architecture that supports an NVMe block storage protocol over a wide range of storage networking fabrics such as Ethernet, Fibre Channel, InfiniBand, and other network fabrics. NVMeoF is compatible with different network stacks for Transmission Control Protocol (TCP)/Internet Protocol (IP) and remote direct memory access (RDMA) over the underlying fabrics.

Many large-scale services (e.g., cloud-based services) that target a variety of applications can be hosted by a number of servers in a datacenter. Such services are often required to be interactive, resulting in sensitivity to a response time. Therefore, high-performance storage devices that can have low data access latency while providing a high throughput become prevalent in today's datacenters.

In particular, NVMe-based SSDs and NVMeoF devices are becoming storages of choice for a datacenter due to their high bandwidth, low latency, and excellent random input/output (I/O) performance. However, those high-performance storage devices can introduce periodic latency spikes due to background tasks such as garbage collection. On the other hand, multiple services co-located on the same server can increase latency unpredictability when applications running the services compete for shared system resources such as central processing units (CPUs), memory, and disk bandwidth of the storage devices over the underlying fabric. The latency spikes and unpredictability can lead to a long tail latency that can significantly decrease the system performance.

Workload scheduling is a critical issue for a multi-tenant application server that distributes resources to the tenant applications. An application container controls an application instance that runs within a type of virtualization scheme. This is referred to as container-based virtualization. In container-based virtualization, the individual instances of the application can share an operating system (OS) of the system with simply different code containers for libraries and other resources.

A typical large-scale system of a datacenter has a datacenter-level scheduler. The datacenter-level scheduler centralizes decision-making for workload migration by taking into account the application's QoS requirement and the underlying server-level resources including CPU cores and memory resources. However, the server-level resources provide limited support for storage system resources. In general, the datacenter-level scheduler attempts to minimize data movement from one storage device to another storage device. For example, when migrating a workload, the datacenter-level scheduler selects a target node among a plurality of candidate nodes based on the proximity to the current node where the data is stored and/or the bandwidth available for the data movement from the current node to the target node.

While the datacenter-level scheduler can provide global-level resource visibility and complex scheduling algorithms, it suffers from several shortcomings. First, the datacenter-level scheduler fails to account for high-performance storage drivers that have lower latency. The high-performance storage drivers can support storage devices of high storage capacity and efficiently share server resources to manage and orchestrate various internal tasks of the storage devices such as garbage collection, wear leveling, bad block remapping, write amplification, overprovisioning, etc. However, the datacenter-level scheduler does not efficiently utilize the high-performance storage driver to its maximum capability. In addition, the datacenter-level scheduler introduces additional complexity when taking corrective actions in cases where the scheduler incorrectly locates workloads across the rack systems in the datacenter. Although the datacenter-level scheduler can perform corrective actions at a datacenter level, it cannot efficiently utilize the data locality and remote execution capability that the latest storage device protocols support.

SUMMARY

According to one embodiment, a method for migrating a workload includes: receiving workloads generated from a plurality of applications running in a plurality of server nodes of a rack system; monitoring latency requirements for the workloads and detecting a violation of the latency requirement for a workload; collecting system utilization information of the rack system; calculating rewards for migrating the workload to other server nodes in the rack system; determining a target server node among the plurality of server nodes that maximizes the reward; and performing migration of the workload to the target server node.

According to another embodiment, a rack system includes: a plurality of server nodes; a plurality of storage devices attached to the rack system; a fabric providing connectivity among the plurality of server nodes and the plurality of storage devices; and a rack-level scheduler comprising a tail latency anomaly monitor (TLAM) and a target discovery unit (TDU). The TLAM is configured to monitor latency requirements for the workloads and detect a violation of the latency requirement for a workload. The TDU is configured to: collect system utilization information of the rack system; calculate rewards for migrating the workload to other server nodes in the rack system; and determine a target server node among the plurality of server nodes that maximizes the reward.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a rack-level scheduler for reducing long tail latencies of high-performance SSDs. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method provides a rack-level scheduler that can efficiently schedule workloads within a rack system in a datacenter. The terms "rack system," "rack," "chassis," "server rack," and "rack server" may be interchangeably used herein without deviating from the scope of the present disclosure. A chassis of a single rack unit may include one or more servers.

The present rack-level scheduler can dynamically detect and shift workloads with a long tail latency among multiple servers in the rack system. In particular, the present rack-level scheduler can maximize the performance of high-performance storage drives such as NVMe-based solid-state drives (SSDs) and distributed high-performance storage drives such as NVMeoF devices. The present rack-level scheduler is distinguished from a conventional global resource management scheme in that it minimizes data movement and overhead for message passing among the nodes in different racks. The minimized data movement and overhead can provide an efficient solution to reduce the tail latency of workloads.

Further, the present rack-level scheduler provides a scalable rack-level scheduling solution that can manage workloads in a distributed high-performance storage system. The present rack-level scheduler can be implemented in a driver, and deployed in existing server racks without extensive modifications to attached storage devices, operating system (OS), and other subsystems and components of a rack system.

According to one embodiment, the present scheduler provides rack-level workload scheduling that is supplementary to a datacenter-level scheduler. The present rack-level scheduler can take corrective actions with co-operative workload migration overriding the workload scheduling of the datacenter-level scheduler. In the case of network-attached storage devices, the present rack-level scheduler can provide a driver-based storage management solution to maximize the performance of the attached storage devices, such as high-performance NVMeoF-compatible SSD devices.

The present scheduler introduces a second level of scheduling intelligence at a rack level that is complementary to a datacenter-level scheduling. In particular, the present rack-level scheduler can be used to manage workloads for high-performance distributed SSDs in an NVMeoF networking stack such that containerized applications can run to maximize the system utilization without application-level interference.

Figure 1:
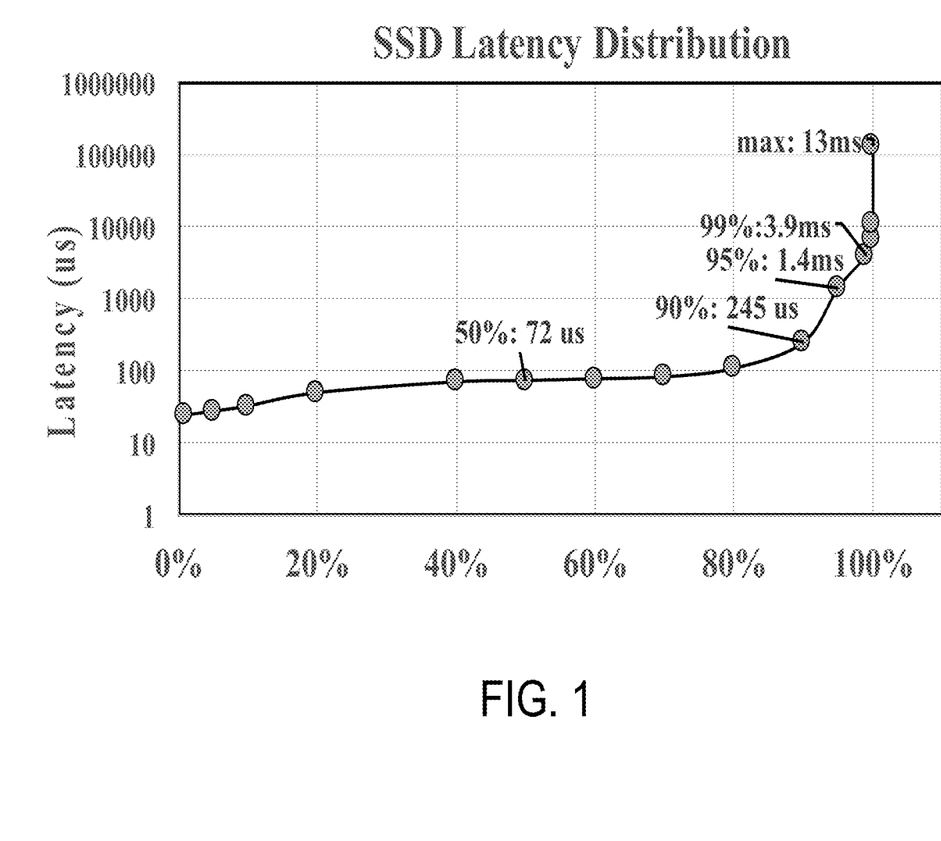
FIG. 1 shows random write-access latency distribution of an example SSD running a datacenter-level scheduler.

FIG. 1 shows random write-access latency distribution of an example SSD running a datacenter-level scheduler. The datacenter-level scheduler schedules workloads generated by containerized applications. The latency distribution shown in FIG. 1 exhibits inherent issues of the datacenter-level scheduler, in that the datacenter-level scheduler is not very efficient at reducing the long tail latency of workloads. In the present example, 80% of the latency is within 100 us, and 1% of the requests have a latency longer than 3.9 ms.

Figure 2:
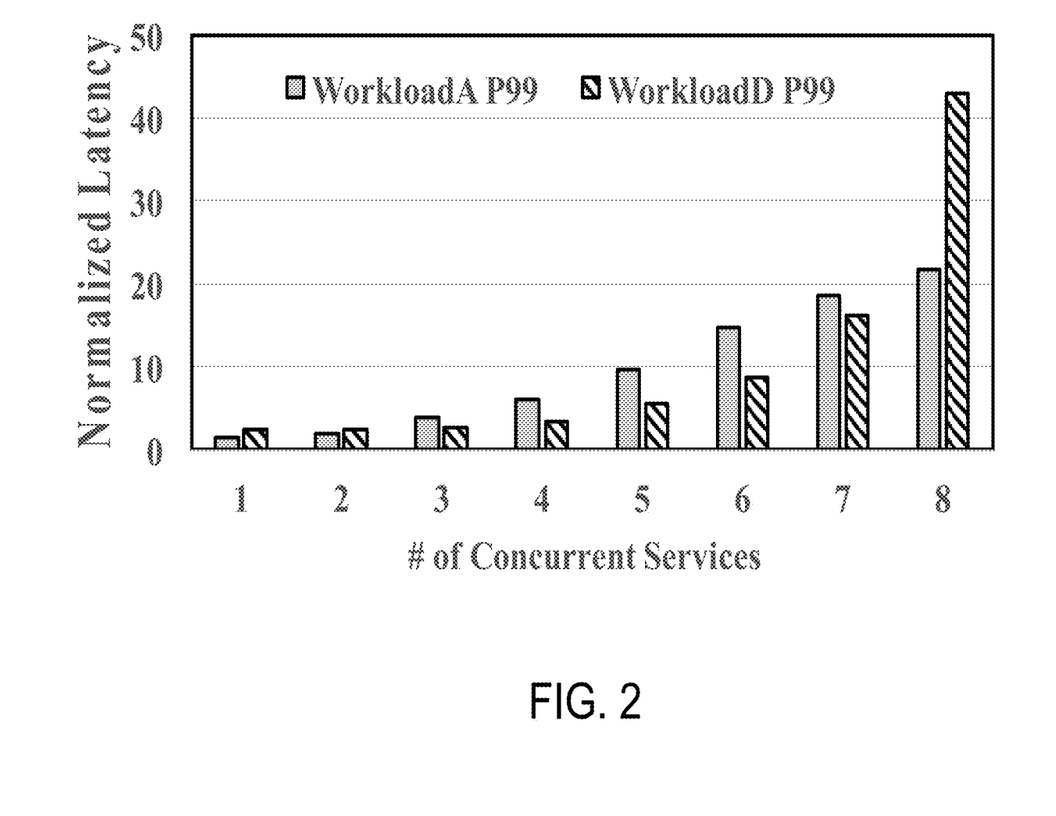
FIG. 2 shows a normalized latency distribution of an example SSD.

FIG. 2 shows a normalized latency distribution of an example SSD. The normalized latency distribution shows that long tail latency increases exponentially as more services are concurrently running on the same server. That is, the services compete for the common server resources including the CPU, memory, storage and network resources, resulting in increased latency.

Figure 3:
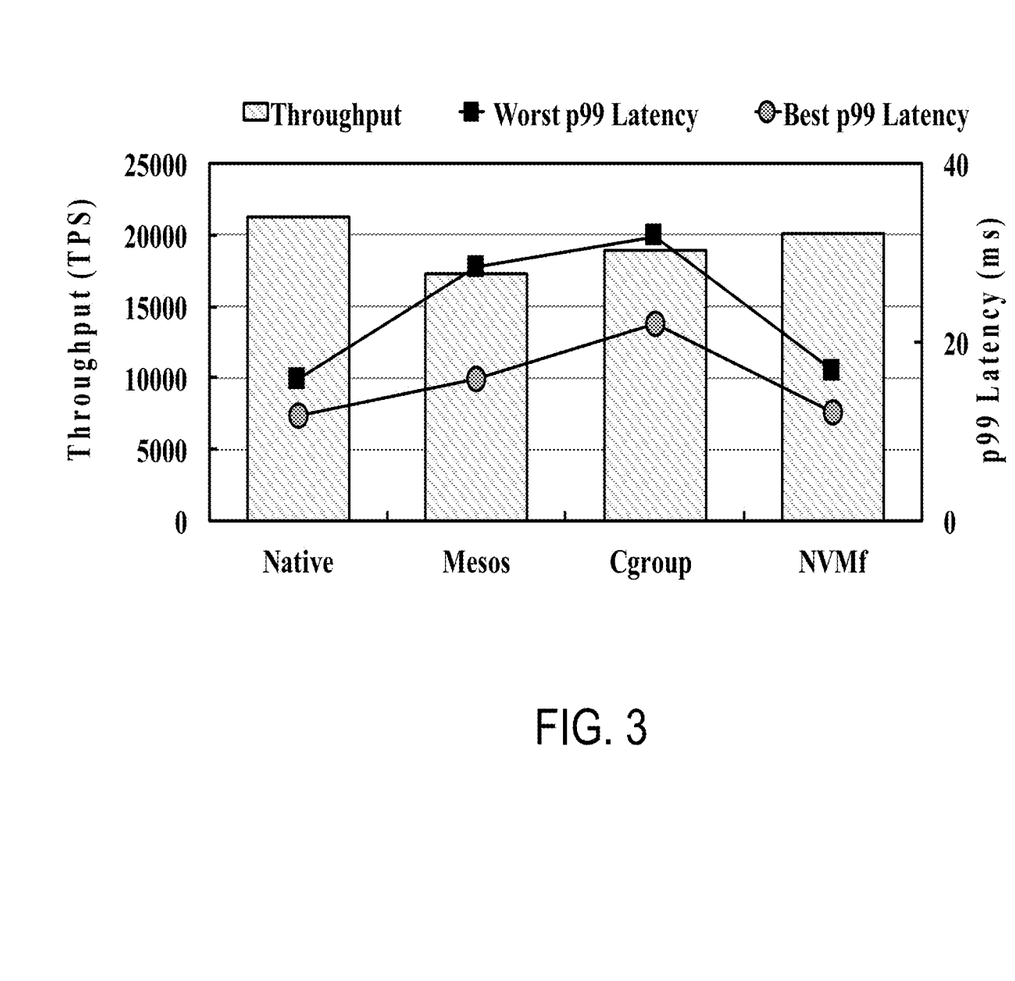
FIG. 3 shows throughput and latency characteristics of co-executing containerized applications for various scheduling and resource management schemes.

FIG. 3 shows throughput and latency characteristics of co-executing containerized applications for various scheduling and resource management schemes. In the present example, a total of eight workloads including worst and best p99 latencies for each of native, Mesos and Cgroups, and NVMeoF scheduling resource management schemes are shown. The comparison result shows that the existing scheduling and resource management schemes such as Mesos and Cgroups schemes are not as effective in reducing the tail latency of workloads as the native and NVMeoF schemes when multiple workloads are concurrently executed. An interesting observation of the comparison result is that the difference between the worst case p99 latency and the best p99 latency is larger for the Mesos and Cgroups schemes compared to the native and NVMeoF schemes. This indicates that shifting the worst performing workloads from the current node to another node with more resources can result in decreasing a difference between the best and the worst-case latencies.

Traditionally, workload shifting among different nodes has been a difficult task because it is required to migrate data associated with the workload when shifting the workload, and data migration was a difficult, time consuming task. However, an NVMeoF-based system allows multiple server nodes running in a rack to simultaneously connect to a plurality of NVMeoF storage devices that are attached to the same rack through a high-speed fabric such as Ethernet. For example, Ethernet can provide a high-speed/bandwidth link among the co-located server of 40 Gbps or more. Using the high-speed/bandwidth link, workloads that fail to satisfy a tail latency requirement (e.g., the worst 99% latency) can be migrated from one server node to another server node faster and easier compared to the existing datacenter-level schedulers.

Figure 4:
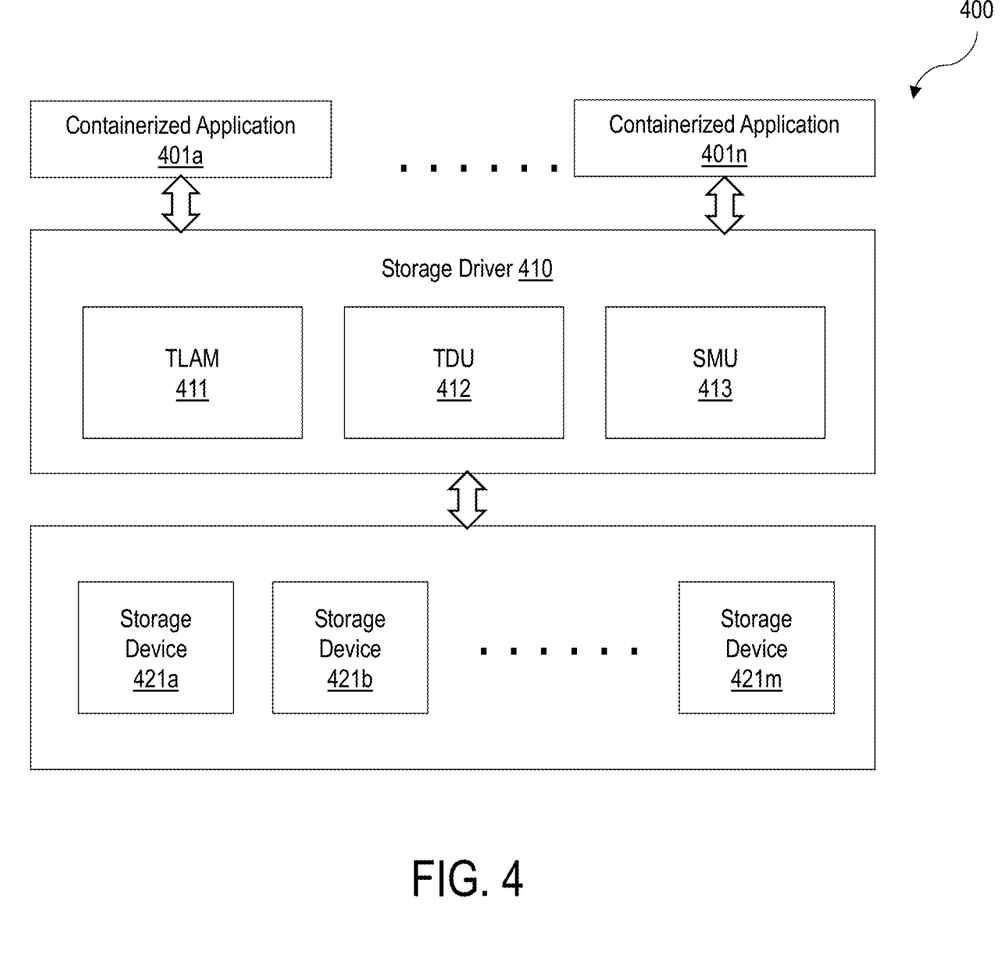
FIG. 4 shown an example storage system including a rack-level scheduler, according to one embodiment.

FIG. 4 shown an example storage system including a rack-level scheduler, according to one embodiment. The rack system 400 includes a plurality of containerized applications 401a-401n and a plurality of attached (locally or remotely) storage devices 421a-421m. A storage driver 410 can manage and schedule workloads generated by the containerized applications 401a-401n to access one or more of the attached storage devices 421a-421m. The storage driver 410 may be conveniently referred to as a daemon, a kernel module, or a device driver. The storage devices 421a-421m may be plugged into a plurality of device ports of the rack system 400.

The rack system 400 can include a plurality of server nodes. Each of the server nodes can run one or more containerized applications 401. For example, a server node can run eight (or more) containerized applications. Some of the server nodes may run one or more virtualized machines that run a common host operating system, for example, WINDOWS and LINUX. The containerized applications 401 can concurrently access data stored in one or more attached storage devices 421.

Each of the storage devices 421a-421m includes a hardware component (e.g., a system-on-chip (SoC) module) and/or a firmware for controlling access to the data stored in a storage medium of the storage device, such as flash memory. According to one embodiment, the storage driver 410 can employ a feedback loop for communicating with the firmware of the storage device 421. A plurality of multiple server nodes that are co-located in the rack system 400 can run the containerized applications 401a-401n. During the runtime, the containerized applications 401a-401n can generate a workload to the storage driver 410. The storage driver 410 manages the control and operations of the associated storage devices 421a-421m at a rack level.

The storage driver 410 may be running in a kernel space or a user space of a host OS for a particular server node. The storage driver 410 passes the workloads to the firmware of a target storage device 421. The firmware of the target storage device 421 performs the actual operation (e.g., read, write, and modify) of the workloads on the target storage device 421.

According to one embodiment, the firmware may be implemented in a hardware component (e.g., a system-on-chip (SoC) module) of the storage device 421 that manages data compression and/or deduplication when accessing data on the storage device 421. Upon completion of an instructed operation, the SSD firmware can generate and returns a response (e.g., success or failure) to the storage driver 410. The storage driver 410 can send the response back to the host OS to report the completion of the instructed operation. The response may include an indication of success or failure of the workload migration from a server node to another server node.

According to one embodiment, the storage driver 410 can include a tail latency anomaly monitor (TLAM) 411, a target discovery unit (TDU) 412, and a service migration unit (SMU) 413. The TLAM 411 can be launched either as a background daemon or as a part of the storage driver 410 that is launched after a boot up of the corresponding server node.

According to one embodiment, the TLAM 411 can constantly monitor and tag each workload with a threshold latency (e.g., a p99 latency) that violates a predetermined latency requirement. A violation of the latency requirement for the workload can be detected when a tail latency of the workload is higher than a predetermined threshold latency. If the TLAM 411 detects a workload that violates the predetermined latency requirement, the TLAM 411 can mark and send the ID number of the workload to the TDU 412.

The TDU 412 can sample system utilization information locally to share with other server nodes running in the rack system 400. The TDU 412 can make a local decision to migrate the workload from one server node to another server node based on the system utilization information.

Figure 5:
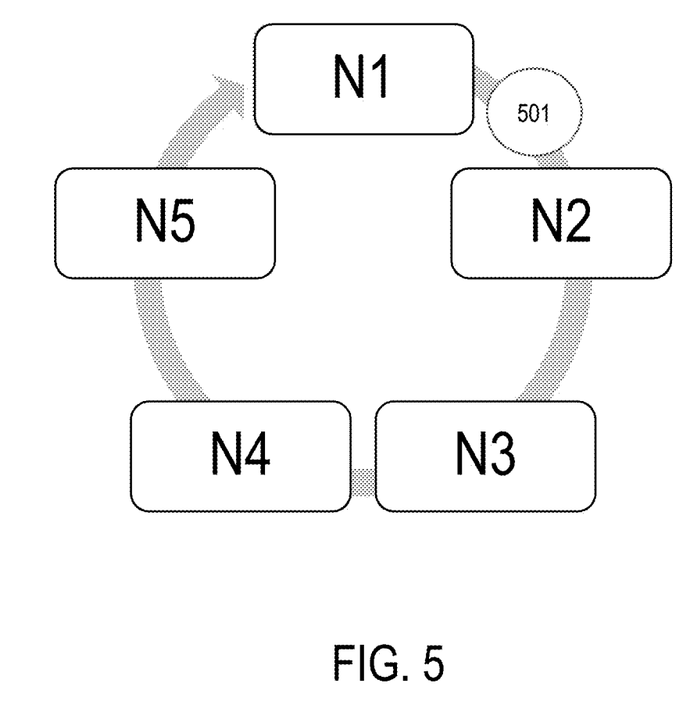
FIG. 5 shows a topology of an example token ring employed by a target discovery unit, according to one embodiment.

According to one embodiment, the TDU 412 can exchange the system utilization information with other server nodes within the same rack utilizing a token ring topology. FIG. 5 shows a topology of an example token ring employed by a TDU, according to one embodiment. A rack system includes server nodes N1 to N5. A token 501 can be passed among the server nodes N1 to N5 in a round robin fashion. Only the server node that holds the passing token 501 can make a decision regarding workload migration. In some embodiments, multiple tokens may be used for each of the resident host operating systems. In other embodiments, multiple tokens may be used for different groups of containerized applications that may access different storage devices that are mutually exclusive. The token ring topology shown in FIG. 5 illustrates that risks of flooding the same candidate server node by multiple server nodes when shifting workloads without the knowledge of simultaneous actions by other server nodes is reduced.

According to one embodiment, the TDU 412 can perform calculation of rewards for migrating a workload from one node to another node using a reward function. Different reward functions can be used to determine the best candidate server node that can maximize the benefit of migrating a specific workload. In order to determine the efficiency, for example, a reward for workload migration, the TDU 412 should know the system utilization information of the actively running server nodes.

According to one embodiment, the reward function is a linear weighted function of one or more system utilization parameters. The one or more system utilization parameters are given the respective weights to calculates the reward function. The system utilization parameter having a heavier weight implies that the system utilization parameter provides more rewards compared to other system utilization parameters. To calculate a reward value that can be applied to various system utilization parameters, the system utilization parameters may be normalized. For example, the system utilization parameters represented by a ratio of the resources (a unit less number) available at a candidate server node with respect to the available resources at the current server node. Examples of such system utilization parameters include, but are not limited to, a number of available CPUs, a size of available memory, an available network bandwidth, and an available disk bandwidth. The system utilization parameters may dynamically change depending on the current availability and usage of the corresponding system resources.

For example, the reward function can be expressed by the following equation:

$$Reward(j,i) = A_i * Rcpu_j + B_i * Rmem_j + C_i * Rnet_j + D_i * Rdisk_j,$$

where: node i is a node that makes a decision to migrate a workload, and node j is a candidate node for migrating the workload. Ai, Bi, Ci, and Di are weights of the server node i that are adjusted based on the workload's requirement for the CPU, memory, network bandwidth, and disk bandwidth, respectively.

For example, $Rcpu_j$, $Rmem_j$, $Rnet_j$, and $Rdisk_j$ are ratios of an increased resource delta in the candidate server node j comparing with the available resources of the server node i to the amount of that resource that is required by the workload. For example, the disk bandwidth Rdisk may be equivalent to an NVMeoF network bandwidth when the nodes are accessing storage remotely within the same rack system. If the calculated reward for migrating the workload to a candidate node is less than a threshold, the TDU 412 can determine not to migrate the workload. If the reward is higher than the threshold, the TDU 412 can identify the candidate node that can maximize the reward among all the candidate server nodes in the rack system. The threshold for the reward function can be determined based on the selection of the weights A, B, C, and D. In addition, the threshold can be dynamically adjusted during a runtime to reflect the changes of the system resource utilization. While the present reward function is focused on reducing tail latency, the TDU 412 can employ other reward functions that can additionally account for a cost (e.g., power and cooling costs) for migrating workloads to make a consolidated decision not only for the current performance but also a total cost of the workload migration.

After the TDU 412 makes the determination to migrate a workload, the TDU 412 can instruct the SMU 413 to perform an actual migration of the workload. For an NVMeoF-based system, multiple server nodes on the same rack are connected to a shared storage network, and the data associated with the workload migration may be stored in the shared storage network. In this case, the workload migration among the server nodes in the shared storage network become much easier because the data is readily available to any server node through the shared storage network.

According to one embodiment, the SMU 412 can flush process states residing in the system cache and memory to a target storage device 421. If the NVMeoF bandwidth to the target storage device is unavailable, the SMU 412 can temporality flush the process states to a local disk or an alternative storage device in the rack. The SMU 412 can continue to try to flush the process states to the target storage device 421 after a delay (e.g., 2 mins) until a predetermined number of retries is failed.

Referring to FIG. 4, the TLAM 411 of the present rack-level scheduler can run either as a background daemon or as a part of the kernel storage driver 410. The TLAM 411 can identify latency anomalies of workloads generated by the containerized applications 401 that are concurrently running in the rack system 400. The TLAM 411 can keep track of processes that have higher QoS requirements and processes that are critical and need to stay local. According to one embodiment, the TLAM 411 and the TDU 412 can be implemented in a similar mechanism. In order to accelerate decision making, both the TLAM 411 and the TDU 412 can be implemented in the same hardware or the same kernel storage driver 410. For example, the TLAM 411 and the TDU 412 can be implemented in a standalone hardware accelerator on a system interface such as PCIe or as a part of the SSD hardware or a network processing unit accelerator. According to one embodiment, the SMU 413 can be implemented in a software module either in a standalone manner or as a part of the distributed storage devices to start a workload migration after a target server node is identified.

According to one embodiment, the TLAM 411, the TDU 412, and the SMU 413 can be implemented in a specific storage driver 410 that is running within the rack system 400. More than one storage drivers 410 can be running concurrently. According to another embodiment, the TLAM 411, the TDU 412, and the SMU 413 can be implemented as being distributed on a node basis within the rack system 400. In this case, a subset of the server nodes may include the TLAM and the TDU. According to yet another embodiment, the TLAM 411, the TDU 412, and the SMU 413 can be implemented only on one master server node within the rack system 400 or in a top-of-rack (TOR) switch hardware. In this case, the distributed modules running on each constituent server node can have an application programming interface (API) call that provides the node-level information to the master server node periodically.

Figure 6:
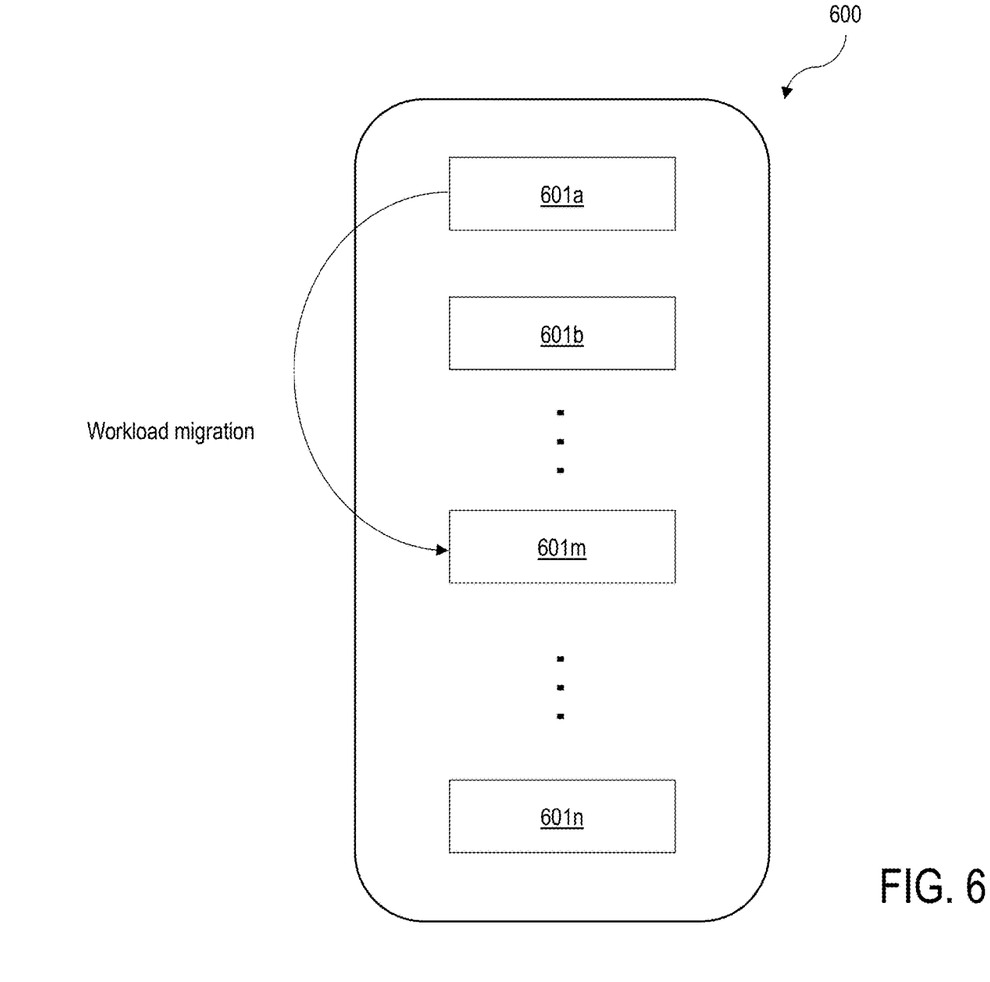
FIG. 6 shows an example of a rack system including a rack-level scheduler, according to one embodiment.

FIG. 6 shows an example of a rack system including a rack-level scheduler, according to one embodiment. A datacenter can have many rack systems, and the datacenter rack 600 can be one of the rack systems in the datacenter. The datacenter rack 600 can include a plurality of server nodes 601*a* to 601*n* and implement a rack-level scheduler.

In a datacenter, a plurality of rack-level schedulers can run concurrently. According to another embodiment, each rack-level scheduler can be implemented per each server node 601 as being distributed within the datacenter rack 600. According to another embodiment, at least one rack-level scheduler can be implemented in a master server node within the datacenter rack 600 or in a top-of-the-rack (TOR) switch hardware.

The rack-level scheduler can include a TLAM, a TDU, and an SMU. The TLAM constantly can monitor and tag workloads that violate a predetermined latency requirement. If the TLAM detects a violation for a specific workload running in the server node 601*a*, the TLAM marks and sends the ID number of the workload to the TDU. The TDU samples and shares its own server-level system utilization information with other server nodes in the datacenter rack 600. Likewise, the TDU can collect the system utilization information of the other rack-level server nodes 601*b* through 601*n* and calculate rewards for migrating the workload to them. Based on the maximum reward, the TDU can determine that the server node 601*m* can maximize the reward among the server nodes 601*b* to 601*n*. Once the TDU identifies the target node 601*m*, the TDU instructs the SMU to perform an actual migration process of the workload.

According to one embodiment, each of the TLAM, the TDU, and the SMU of the rack-level scheduler can be given a proper process priority to efficiently identify and perform workload migration that satisfies the QoS requirement of the datacenter rack 600. The TLAM can periodically poll the system utilization and monitor latency requirements for the incoming workloads. A polling rate of the TLAM may depend on both the availability of the host CPU resources and the criticality of the QoS requirement for different applications and workloads. A properly set process priority of the TLAM, the TDU, and SMU can minimize an overhead that can be incurred by the rack-level scheduler.

According to one embodiment, a migration process by the SMU can be user-controlled. For example, a user can set and control a speed, a size, a sequence, and timing, and an allocation of storage zones for the data and process migration at a fine granularity to efficiently serve the workload migration within the rack system while improving the performance thereof. When performing the workload migration, the SMU can account for other relevant system parameters including buffer sizes and their latency and bandwidth at various levels in the storage and networking stacks of the rack-level scheduler.

According to one embodiment, the process and data migration protocol is compatible with various data transfer fabrics. Examples of such data transfer fabrics include, but are not limited to, Ethernet and RDMA. The data fabric within the datacenter rack 600 allows the server nodes 601 to work with a variety of existing server hardware architectures.

According to one embodiment, the present rack-level scheduler can provide a mechanism for target server node acknowledgement by a feedback loop. For example, the target server node can acknowledge the workload migration as either successful or failed. A failed migration can be repeated through the TDU and the SMU until it becomes successful. The maximum number of retries can be limited to a user-configurable number. The rack-level scheduler can report the success or failure of the workload migration back to the host operating system after a success or after the user-configurable number of retries.

Figure 7:
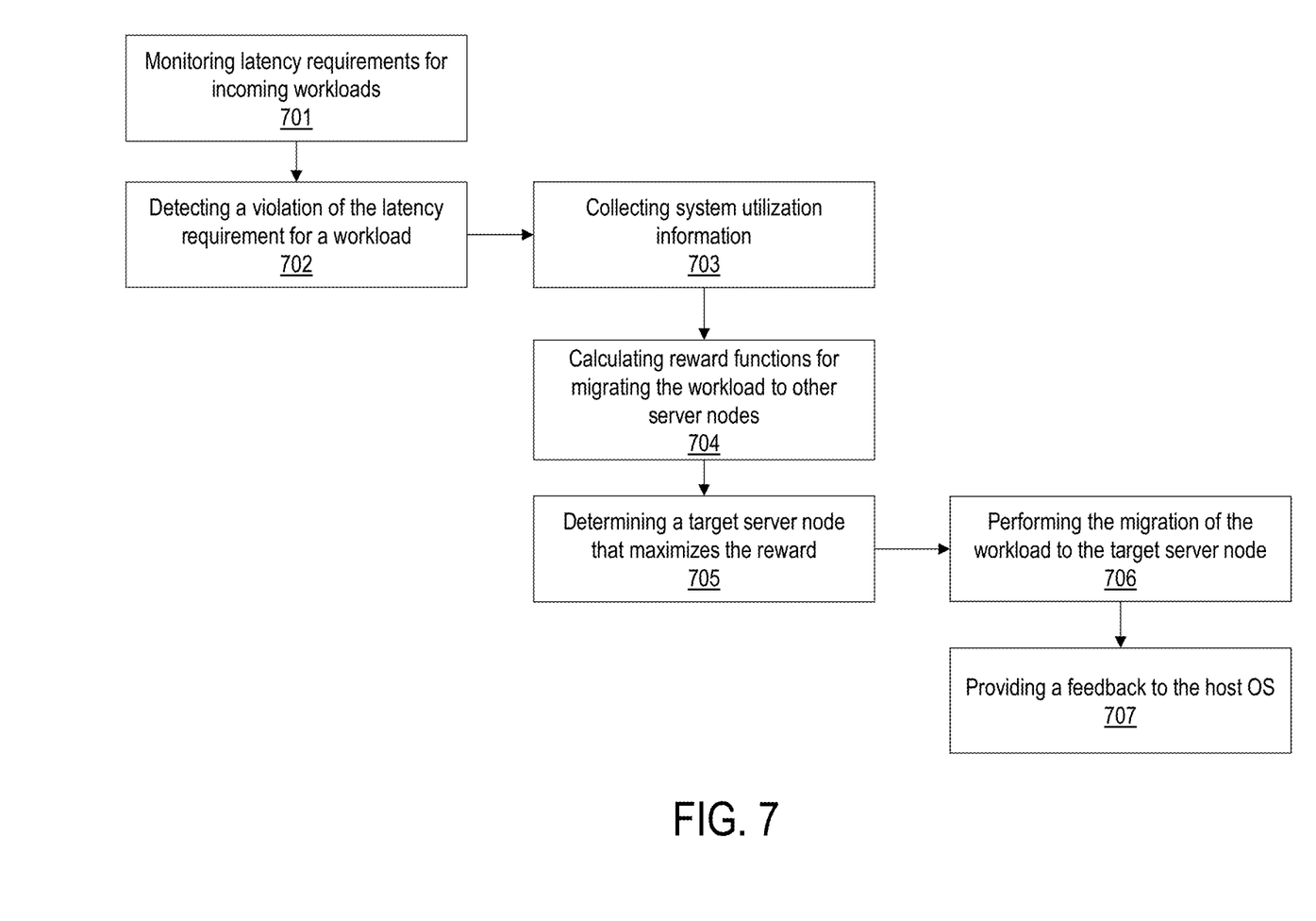
FIG. 7 is a flowchart for migrating a workload, according to one embodiment.

FIG. 7 is a flowchart for migrating a workload, according to one embodiment. A rack-level scheduler is implemented in a rack system. A TLAM of the rack-level scheduler monitors a latency requirement for incoming workloads that are generated from applications running in a plurality of server nodes (701). The TLAN detects a violation of the latency requirement for a workload (702). A TDU of the rack-level scheduler collects system utilization information (703) and calculate rewards for migrating the workload to other server nodes in the rack system (704). The server nodes running in the rack system can concurrently access the attached storage devices, therefore data associated with the workload to migrate need not be migrated among the server nodes for migration. Once the TDU determines a target server node that maximizes the reward (705), the TDU invokes an SMU to perform the migration of the workload to the target server node (706). The rack-level scheduler provides a feedback to the host OS by reporting a status to the host OS (707). The process repeats for performing workload migration within the rack system. The threshold for determining a workload migration may dynamically change depending on the QoS requirements of the applications and/or workloads, and the system utilization of the rack system. For example, a workload marked with a high QoS requirement can be processed with a temporarily increased latency threshold to ensure that the workload is processed with a strict latency requirement. The higher the latency threshold, the less likely that the workload is migrated to another node.

The present rack-level scheduler can be implemented in a software/firmware module or in a hardware (e.g., a SoC module). Workload monitoring and migration among nodes can be performed either as being distributed across the nodes in a rack system or integrated in a master server node. The present rack-level scheduler can perform a second level correcting scheduling decisions to account for the high-performance storage resources and can perform autonomous job (or) application container migration within a rack. The present rack-level scheduler can perform a tail latency anomaly detection to identify problematic workloads on a per-node-basis that fail to meet the QoS requirement. Further, the present rack-level scheduler can intelligently detect potential candidate nodes that advertise their abilities and using a decision algorithm to identify a reward for workload migration. The autonomous workload migration can keep the system state synchronous and consistent during and after the workload migration by utilizing the benefits of the NVMeoF technology to achieve a local node-like storage latency even for remotely executing workload migration.

According to one embodiment, a method for migrating a workload includes: receiving workloads generated from a plurality of applications running in a plurality of server nodes of a rack system; monitoring latency requirements for the workloads and detecting a violation of the latency requirement for a workload; collecting system utilization information of the rack system; calculating rewards for migrating the workload to other server nodes in the rack system; determining a target server node among the plurality of server nodes that maximizes the reward; and performing migration of the workload to the target server node.

The method may further include providing a feedback to a host operating system including a status of the migration.

The rack system may include a plurality of storage devices.

The rack system may be compatible with a nonvolatile memory express over fabrics (NVMeoF) standard, and the plurality of storage devices may be NVMeoF devices.

The violation of the latency requirement for the workload may be detected when a tail latency of the workload is higher than a latency threshold.

The latency threshold may dynamically change depending on a quality of service (QoS) requirement of the plurality of applications and/or the workloads, and system utilization of the rack system.

The rewards may be calculated by a reward function, and the reward function may be a linear weighted function of a plurality system utilization parameters.

The system utilization parameters may include one or more of a number of available CPUs, a size of available memory, an available network bandwidth, and an available disk bandwidth.

The method may further include passing a token among the plurality of server nodes in a round robin fashion, wherein only a server node among the plurality of server nodes that holds the token may determine to migrate the workload.

According to another embodiment, a rack system includes: a plurality of server nodes; a plurality of storage devices attached to the rack system; a fabric providing connectivity among the plurality of server nodes and the plurality of storage devices; and a rack-level scheduler comprising a tail latency anomaly monitor (TLAM) and a target discovery unit (TDU). The TLAM is configured to monitor latency requirements for the workloads and detect a violation of the latency requirement for a workload. The TDU is configured to: collect system utilization information of the rack system; calculate rewards for migrating the workload to other server nodes in the rack system; and determine a target server node among the plurality of server nodes that maximizes the reward.

The rack-level scheduler may further include a service migration unit (SMU) that is configured to perform migration of the workload to the target server node.

The SMU may be further configured to provide a feedback to a host operating system of the rack system including a status of the migration.

The rack system may be compatible with an NVMeoF standard, and the plurality of storage devices may be NVMeoF devices that are connected to each other by Ethernet.

The TLAM may detect the violation of the latency requirement for the workload when a tail latency of the workload is higher than a latency threshold.

The latency threshold may dynamically change depending on a quality of service (QoS) requirement of the plurality of applications and/or the workloads, and system utilization of the rack system.

The TDU may calculate the rewards using a reward function, and the reward function may be a linear weighted function of a plurality system utilization parameters.

The system utilization parameters may include one or more of a number of available CPUs, a size of available memory, an available network bandwidth, and an available disk bandwidth.

The plurality of server nodes may pass a token in a round robin fashion, wherein only a server node among the plurality of server nodes that holds the token may determine to migrate the workload.

A subset of the plurality of server nodes may include the TLAM and the TDU.

A master server node among the plurality of server nodes may include the TLAM and the TDU.

The rack-level scheduler may be implemented in a system-on-chip (SoC) module.

The rack-level scheduler may be implemented in a firmware of a top-of-rack (TOR) switch hardware.

The above example embodiments have been described hereinabove to illustrate various embodiments of implementing a system and method for providing a rack-level scheduler for reducing long tail latencies of high-performance SSDs. Various modifications and departures from the disclosed example embodiments will occur to those having ordinary skill in the art. The subject matter that is intended to be within the scope of the invention is set forth in the following claims.

What is claimed is:

1. A method for migrating a workload comprising:
receiving workloads generated from a plurality of applications running in a plurality of server nodes of a rack;
monitoring latency requirements for the workloads and detecting a violation of the latency requirement for a workload from the workloads;
collecting system utilization information of the rack;
calculating rewards for migrating the workload to other server nodes in the rack based on the system utilization information;
determining a target server node among the plurality of server nodes that maximizes the reward; and
performing migration of the workload to the target server node,
wherein the latency threshold dynamically changes depending on a quality of service (QoS) requirement of the plurality of applications and/or the workloads, and system utilization of the rack, and
wherein the rewards are calculated by a reward function, and the reward function is a linear weighted function of a plurality system utilization parameters.

2. The method of claim 1, further comprising providing a feedback to a host operating system including a status of the migration.

3. The method of claim 1, wherein the rack comprises a plurality of storage devices.

4. The method of claim 1, wherein the rack is compatible with a nonvolatile memory express over fabrics (NVMeoF) standard, and the plurality of storage devices are NVMeoF devices.

5. The method of claim 1, wherein the violation of the latency requirement for the workload is detected when a tail latency of the workload is higher than a latency threshold.

6. The method of claim 1, wherein the system utilization parameters include one or more of a number of available CPU cores, a size of available memory, an available network bandwidth, and an available disk bandwidth.

7. The method of claim 1, further comprising passing a token among the plurality of server nodes in a round robin fashion, wherein only a server node among the plurality of server nodes that holds the token determines to migrate the workload.

8. A rack comprising:
a plurality of server nodes;
a plurality of storage devices attached to the rack;
a fabric providing connectivity among the plurality of server nodes and the plurality of storage devices; and
a scheduler comprising a tail latency anomaly monitor (TLAM) and a target discovery unit (TDU),
wherein the TLAM is configured to monitor latency requirements for the workloads and detect a violation of the latency requirement for a workload from the workloads, and
wherein the TDU is configured to:
collect system utilization information of the rack;
calculate rewards for migrating the workload to other server nodes in the rack based on the system utilization information;
determine a target server node among the plurality of server nodes that maximizes the reward; and
migrating the workload to the target server node,
wherein the latency threshold dynamically changes depending on a quality of service (QoS) requirement of the plurality of applications and/or the workloads, and system utilization of the rack.

9. The rack of claim 8, wherein the scheduler further comprises a service migration unit (SMU) that is configured to perform migration of the workload to the target server node.

10. The rack of claim 9, wherein the SMU is further configured to provide a feedback to a host operating system of the rack including a status of the migration.

11. The rack of claim 8, wherein the rack is compatible with an NVMeoF standard, and the plurality of storage devices are NVMeoF devices that are connected via Ethernet.

12. The rack of claim 8, wherein the TLAM detects the violation of the latency requirement for the workload when a tail latency of the workload is higher than a latency threshold.

13. The rack of claim 8, wherein the TDU calculates the rewards using a reward function, and the reward function is a linear weighted function of a plurality system utilization parameters.

14. The rack of claim 13, wherein the system utilization parameters include one or more of a number of available CPU cores, a size of available memory, an available network bandwidth, and an available disk bandwidth.

15. The rack of claim 8, wherein the plurality of server nodes pass a token in a round robin fashion, wherein only a server node among the plurality of server nodes that holds the token determines to migrate the workload.

16. The rack of claim 8, wherein a subset of the plurality of server nodes includes the TLAM and the TDU.

17. The rack of claim 8, wherein a master server node among the plurality of server nodes includes the TLAM and the TDU.

18. The rack of claim 8, wherein the scheduler is implemented in a system-on-chip (SoC) module.

19. The rack of claim 8, wherein the scheduler is implemented in a firmware of a top-of-rack (TOR) switch hardware.

* * * * *